July 7, 1959     R. H. NORRIS     2,893,309
END-STAMPING DIE
Filed Jan. 10, 1958
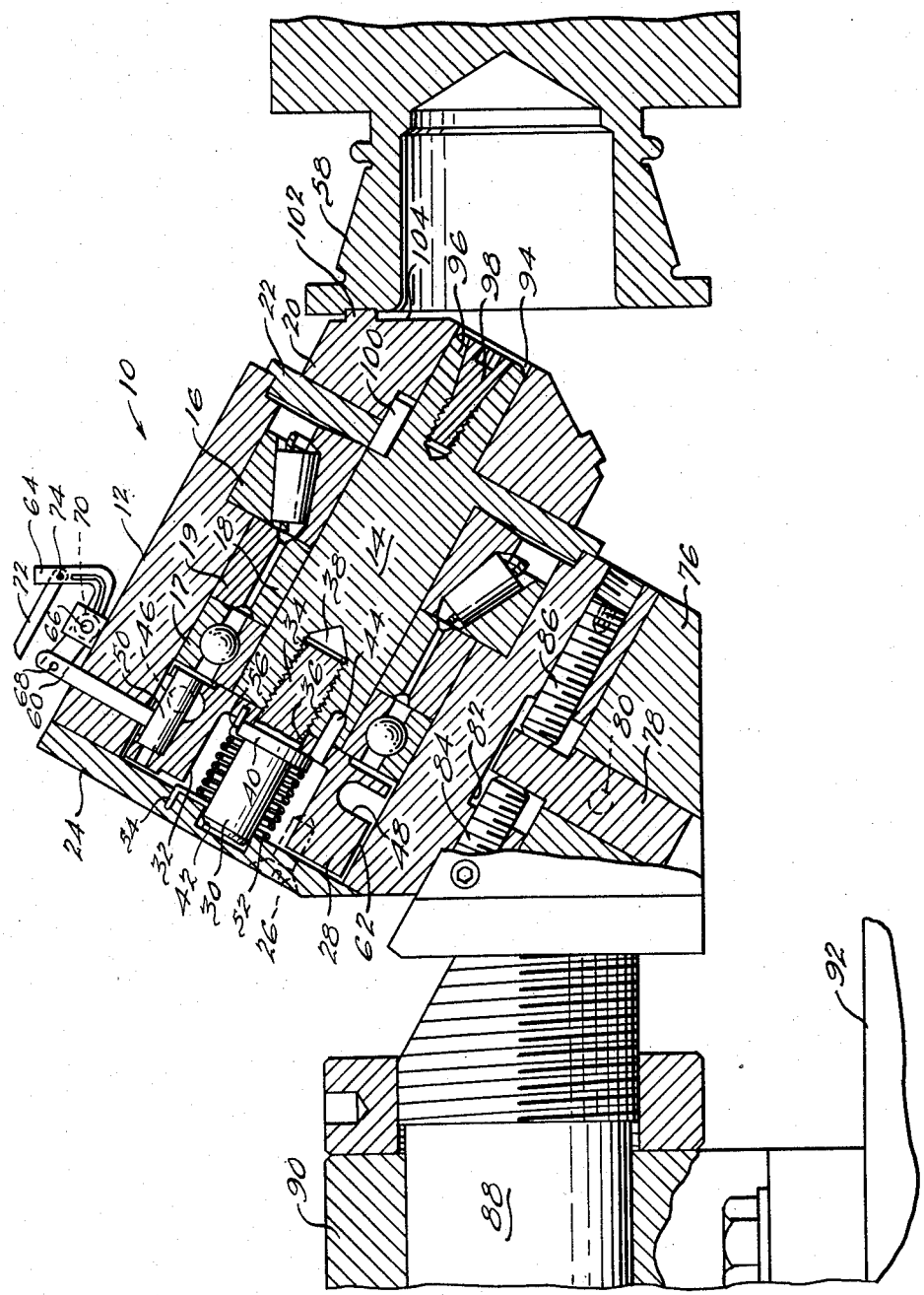
INVENTOR.
Richard H. Norris.
BY
ATTORNEYS

United States Patent Office 2,893,309
Patented July 7, 1959

2,893,309

END-STAMPING DIE

Richard H. Norris, Oak Park, Mich., assignor to New Method Steel Stamps, Inc., Detroit, Mich., a corporation of Michigan Application January 10, 1958, Serial No. 708,140

7 Claims. (Cl. 101—7)

This invention relates broadly to marking tools.

More particularly, the invention is an improvement in the marking tool disclosed in the co-pending application Serial No. 552,634, filed December 12, 1955.

The marking tool disclosed in the above entitled application is pre-eminently satisfactory under all normal operating conditions. However, some trouble has been experienced in situations where excessive pressure is imposed on the marking die. This can happen in several ways but damage occurs most often as a result of an oversize part. The slide which carries the marking tool usually is advanced against a stop by hydraulic pressure, and the stop is adjusted to embed the marking indicia of the die a desired distance in the workpiece. However, if the work is substantially oversize excessive pressure is imposed on the die and its operating mechanism. Depending upon the circumstances under which the accident occurs the marking die may be ruined, the spindle which carries the die may be snapped or twisted, the bearings which support the spindle may be broken or the locating pin which initially adjustably locates the tool may be sheared. When the tool is overstressed to such an extent that any of these contingencies occur it usually must be entirely replaced at considerable expense.

An important object of the present invention is to provide a marking tool of the above mentioned character that is uniquely constructed so that overstressing of the tool will not damage any major part of the tool.

Another object of the invention is to provide a marking tool of the above mentioned character that is uniquely constructed so that only minor, inexpensive and easily replaceable parts will be damaged under conditions that heretofore destroyed the entire tool.

Other objects and advantages of the invention will be apparent during the course of the following description.

In the drawing forming a part of this specification and wherein like numerals are employed to designate like parts throughout the same, Figure 1 shows a marking tool embodying the invention mounted on the slide of a machine and operatively associated and in marking engagement with a workpiece.

In the drawing wherein for the purpose of illustration is shown a preferred embodiment of the invention, the numeral 10 designates a marking tool having a cylindrical housing 12. A spindle 14 disposed centrally within the housing 12 is supported for rotation by front and rear bearings 16 and 17 separated by spacers 18 and 19. A marking die 20 is mounted on the projecting forward end of the spindle 14, and a pawl and ratchet mechanism is attached to the rearward end thereof. The front of the housing 12 is closed by a flange 22 on the spindle 14, and the rear of the housing is closed by a cap plate 24 detachably fastened to the housing by screws 26.

The pawl and ratchet mechanism comprises a ratchet disk 28 disposed in the rear portion of the housing 12 and overlying the reaward end of the spindle 14. A pin 30 received within a central recess 32 in the ratchet disk 28 has a threaded end portion 34 which extends through an opening 36 in the bottom of the disk and into an internally threaded hole 38 in the spindle 14. A radial flange 40 on the pin 30 seats on the bottom of the recess 32 to hold the spindle 14 abutted solidly against the disk 28. The outer end of the pin 30 is journaled in a recess or socket 42 provided centrally in the cap plate 24. As clearly shown in the drawing, the ratchet disk 28 is additionally rotatably secured to the spindle 14 by a shear pin 44.

The marking die 20 and its associated parts including the ratchet wheel 28 are normally held in a selected initial position by a stop pin 46 carried by the housing 12 and extending tangentially into a peripheral groove 48 for engagement with a pin 50 disposed transversely of the groove, as illustrated and described in detail in the co-pending application hereinabove referred to. A helical spring 52 disposed in the recess 32 around the pin 30 has one end 54 embedded in the cap plate 24 and the other end 56 thereof embedded in the ratchet wheel 28. The spring 52 normally is preloaded to hold the pin 50 against the stop 46.

When the die 20 is jammed against a workpiece 58 as shown in the drawing the marking indicia 102 are pressed into the work and, inasmuch as the work is rotatably driven, corresponding rotation is imparted to the die in a direction to move the pin 50 away from the stop 46 and in a direction to wind up or tighten the spring 52. As soon as the work 58 is released by the die 20 the latter ceases to rotate. The die 20 normally is recessed at the terminal end of the marking indicia so that the die releases the work as soon as the marking operation is completed.

Means is provided for preventing the die from being reversely rotated by the spring 52 as soon as it releases the work 58 and until the tool has been retracted a sufficient distance so that the die can be returned to its initial position without marring or scratching the work. The means here shown comprises a pawl 60 extending radially through the housing 12 and movable into and out of engagement with a band of serrations on the periphery of the ratchet disk 28. The pawl 60 is operated by a bell crank 64 which is pivoted to the housing at 66 and to the pawl at 68. A coil spring 70 normally urges the pawl 60 into engagement with the ratchet disk 28. An operating lever 72 pivoted to the bell crank at 74 is adapted to engage a suitable stop (not shown) when the marking tool is retracted (as shown and described in detail in the mentioned co-pending application). Continued retraction of the tool after the lever 72 engages the stop causes the bell crank 64 to rock in a direction to retract the pawl 60 to release the ratchet wheel 28. This permits the spring 52 to return the marking die 20 to its initial rotative position and to bring the pin 50 again into engagement with the stop 46.

In order to adjust the marking die 20 initially relative to the work 58, the housing 12 is slidably mounted on an inclined base 76. A locating pin 78 held in the base by a set screw 80 projects upwardly into a recess 82 in the housing 12 for engagement by oppositely directed locating screws 84 and 86. Manifestly, the housing 12 can be moved back and forth on the base 76 within limits permitted by the recess 82 by adjusting the screws 84 and 86, and the latter thereafter serve to hold the housing 12 in the selected adjusted position.

A shank 88 extends horizontally from the base 76 and is normally detachably received within a chuck 90 or other suitable mounting means on the main tool slide 92 which operates in the usual manner to move the marking tool into and out of engagement with the work 58.

The marking die 20 can be mounted on the spindle 14 in any suitable manner but it preferably is mounted as shown in the drawing. More particularly, the die has a central opening 94 that fits over and snugly receives a forwardly projecting shank portion 96 of the spindle 14. An expansion screw 98 is provided in the end of the shank 96 and the latter is split so that it expands to clamp the die solidly when the screw 98 is tightened. A drive pin 100 further connects the spindle 14 and die 20 for mutual rotation.

When the die 20 encounters an unusual overstressing situation during the marking operation, such as an oversize workpiece 58, the marking indicia 102 may be fully imbedded in the work and the front face 104 thereof brought into engagement with the work. When this occurs the die 20 may not release the workpiece after the marking operation. As a consequence the die 20 may continue to rotate until the pin 50 again engages with the stop 46. Manifestly, continued rotative driving engagement between the work 58 and the die 20 places excessive strain on the various parts of the tool. Ordinarily, the pin 78 is bent or perhaps sheared and the spindle 14, the bearings 16 and 18, and the ratchet mechanism at the rear of the tool may be severely damaged or even destroyed beyond repair.

According to the present invention, the pin 78 is made of a relatively low strength steel that is strong enough to stand up under ordinary operating conditions but that will shear if a wreck occurs. Excessive strain on the ratchet mechanism is relieved by one or the other of the pins 44 and 100. Occasionally, however, sufficient force may be exerted against the face 104 of the die 20 to cock the pin 30 against the ratchet disk 28 with sufficient force to damage the ratchet mechanism. Accordingly, it is proposed to make the pin 30 of relatively low strength steel. When this is done excessive force of the above character causes the pin 30 to shear at the inner end of the threaded shank 34. As soon as this occurs, the die 20 and the spindle 14 are free to rotate independently of the ratchet mechanism and the latter is relieved of excessive pressure imposed on the die.

Yielding of the pins 78 prevents destruction of the die 20. When the marking tool is retracted from the work 58 by the tool slide 92, the die and the spindle 14 slide forwardly and fall out of the housing 12 undamaged. It will be observed that the threaded portion of the pin 30 extends outwardly beyond the end of the spindle 14, and in the event the pin 30 is sheared the projecting end of the stud 34 can be easily removed preparatory to substituting a new pin 30. Also the pin 78 is inexpensive and readily replaceable as are the shear pins 44 and 100.

It may thus be seen that the tool of this invention has been redesigned to eliminate complete destruction of the tool in the event of a wreck. It is uniquely constructed so that inexpensive and readily replaceable parts yield to save the larger precision finished and expensive parts of the tool.

Having thus described the invention, I claim:

1. A marking tool comprising a housing, a spindle mounted for rotation in said housing, a marking die on the forward end of said spindle, a driven member at the rearward end of said spindle, at least one shearable element connecting said driven member to said spindle, a mounting base supporting said housing and a shearable element connecting said housing to said base.

2. A marking tool comprising a housing, a spindle mounted for rotation in said housing, a marking die on the forward end of said spindle, a driven element at the rearward end of said spindle, at least one shearable element connecting the driven member to the spindle, a mounting base slidably supporting said housing, and means including a shearable element for selectively adjustably positioning said housing on said base.

3. A marking tool comprising a housing, a spindle mounted for rotation in said housing, a marking die on the forward end of said spindle, a driven element at the rearward end of said spindle, at least one shearable element connecting the driven member to the spindle, a mounting base slidably supporting said housing, a shearable pin carried by the base and extending into a recess in said housing, and locating screws carried by the housing bearing on the pin from opposite directions to initially position said housing on said base.

4. A marking tool comprising a housing, a spindle mounted for rotation in said housing, a marking die on the forward end of said spindle, a driven member at the rearward end of said spindle, an element fastening said member to the spindle having a threaded shank extending through the member and into said die, a base supporting said housing, and a shearable element connecting said housing to said base.

5. A marking tool comprising a housing, a spindle mounted for rotation in said housing, a marking die on the forward end of said spindle, a driven member at the rearward end of said spindle, an element fastening said member to the spindle having a threaded shank extending through the member and into said die, a base slidably supporting said housing, and means including a shearable element for selectively adjustably positioning said housing on said base.

6. A marking tool comprising a housing, a spindle mounted for rotation in said housing, a marking die on the forward end of said spindle, a driven member at the rearward end of said spindle, and an element fastening said member to the spindle, said element having an outer portion interengaged with said member and an inner threaded portion in said spindle, the threaded inner portion of said element being shearable from said outer portion and extending outwardly of the spindle to provide an accessible part in the event said inner portion is sheared from said outer portion.

7. A marking tool comprising a housing, a spindle mounted for rotation in said housing, a marking die on the forward end of said spindle, a driven member at the rearward end of said spindle, an element fastening said member to the spindle having a threaded shank extending through the member and into said die, a shearable pin carried by the base and extending into a recess in said housing, and locating screws carried by said housing bearing on the pin from opposite directions to initially position said housing on said base.

References Cited in the file of this patent

UNITED STATES PATENTS

| | | |
|---|---|---|
| 2,399,397 | Simons | Apr. 30, 1946 |
| 2,610,576 | Norris | Sept. 16, 1952 |